March 9, 1937.    E. C. BALLMAN    2,073,532
SINGLE PHASE CONDENSER MOTOR
Filed May 5, 1934
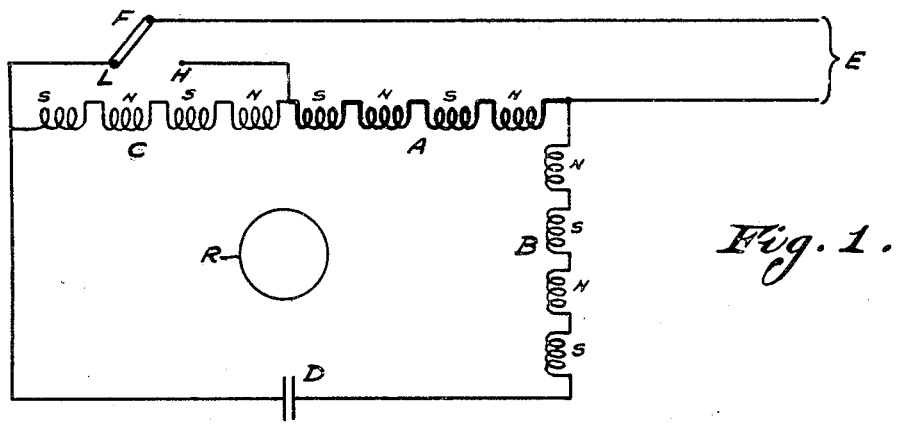
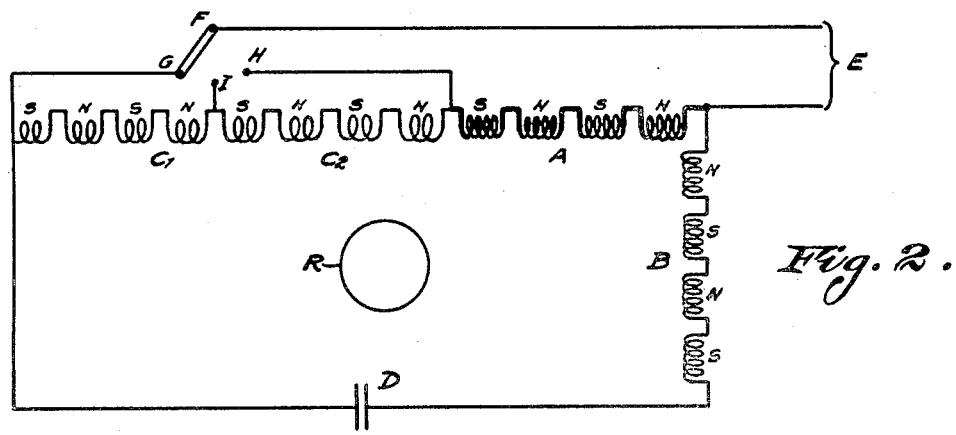
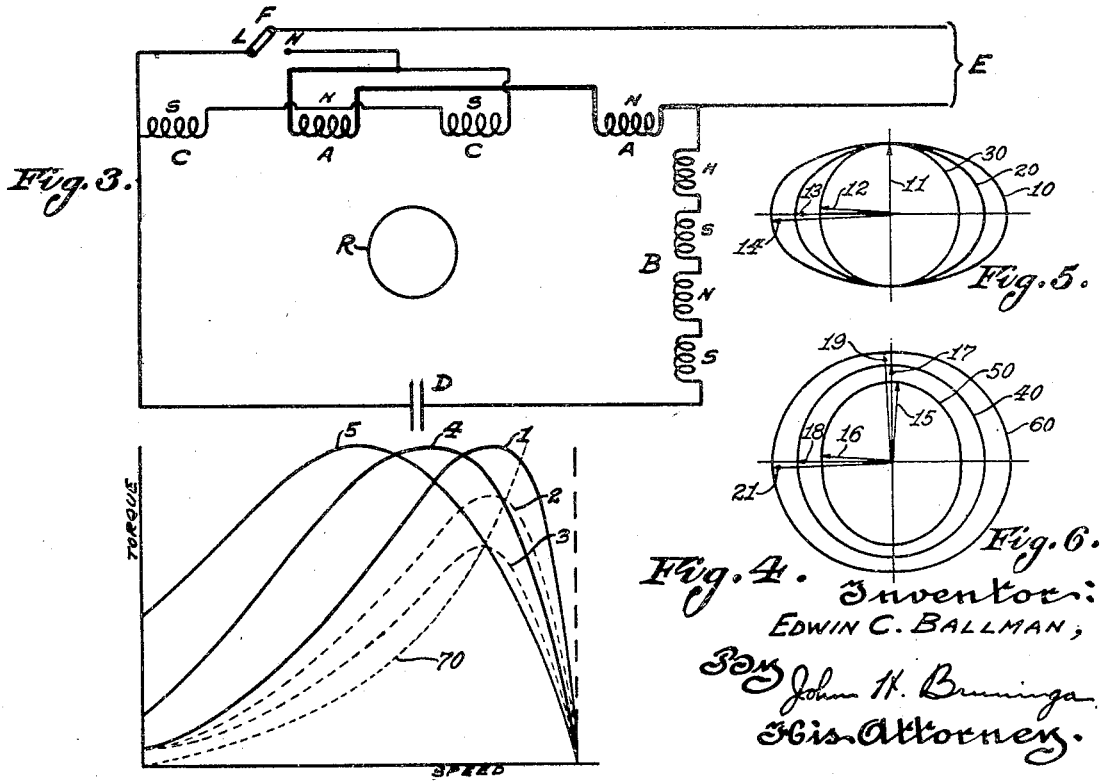
Inventor:
Edwin C. Ballman,
By John H. Bruninga
His Attorney.

Patented Mar. 9, 1937

2,073,532

UNITED STATES PATENT OFFICE 2,073,532

SINGLE PHASE CONDENSER MOTOR

Edwin C. Ballman, St. Louis, Mo.

Application May 5, 1934, Serial No. 724,070

2 Claims. (Cl. 172—278)

This invention pertains to single-phase induction motors, such as are known as condenser motors.

One of the objects of this invention is to provide such a motor which may be operated at various speeds with a good operating torque at all speeds.

Further objects will appear from the following description taken in connection with the accompanying drawing in which:

Figure 1 is a diagram representing the windings of a motor embodying this invention;

Figure 2 is a similar diagram illustrating another embodiment of this invention;

Figure 3 is a similar diagram illustrating still another embodiment of this invention;

Figure 4 is a diagram illustrating the nature of the speed-torque curves obtainable in a motor embodying this invention as compared with similar curves obtained by prior machines;

Figures 5 and 6 are diagrams representing an approximate relation between the main and auxiliary fields under prior conditions and in accordance with this invention respectively.

In the ordinary split-phase condenser motor the stator is equipped with a main winding and an auxiliary winding. The latter winding is so placed with reference to the main winding that its magnetic effect is to produce poles angularly displaced with reference to those of the main winding. This relation between main and auxiliary windings will be expressed in this specification and the appended claims by stating that the auxiliary winding is wound in magnetically angular relation to the main winding. The angle of displacement from the main winding may have any value suitable for the purpose for which the motor is intended, and the circuit on which it is to operate. Usually this angle is between 60° and 90° electrical degrees. A condenser of suitable capacity is usually connected in the circuit of the auxiliary winding so as to produce a leading current in that winding. Thus with the winding arranged in magnetically angular relation to the main winding and the current flowing therein having a leading phase displacement, a condition is established in which the magnetic field in the air gap approaches the usual rotating field obtained in polyphase machines.

The two windings may be so proportioned relatively to each other as to produce practically a true rotating field. Such an adjustment, however, holds true for only one condition, fixing the amplitude and phase relation of the two currents in the main and auxiliary windings. If either of these is changed in value, the relative strength or phase position of the currents is changed and the resulting air gap field takes on a so-called elliptical form. This is due to the fact that one of the windings predominates over the other and the strength of the field will be greater in its axis than in that of the other winding.

In arranging to vary the speed of such an induction motor, the practice has been to vary the strength of one of these fields: namely, that of the main winding. When this is done the balance between the two fields is destroyed so that a resulting elliptical air gap field is obtained. As the auxiliary winding including its condenser is usually connected permanently across the supply mains, the field strength produced thereby will remain substantially constant. In order to increase the speed, the strength of the main winding is increased as is also the magnetic effect produced thereby. Accordingly, as the speed increases the main winding has a stronger magnetic effect than the auxiliary winding and an elliptical field is produced. If the strength of the main winding is further increased in varying speed the eccentricity of the elliptical field is increased. This is an undesirable effect because the more eccentric a field is used, the more nearly the motor approaches the operating characteristics of a synchronous motor, and the more liable it is to fall out of step under excessive load. With this arrangement therefore, the motor operates best at its lowest speed, and its operation becomes more uncertain as the speed is increased.

In accordance with the present invention, speed changes are accomplished by varying the strength of the main winding, as above described. At the same time, however, the excitation of the auxiliary winding is increased so that the strength of the latter winding is augmented to keep pace with that of the main winding.

Referring to Figure 1, the main winding is represented by two sections A and C connected in series. Taps are brought out from the extreme end of section C and also from the middle point between the sections A and C, which taps are connected to contacts L and H respectively, of a switch F, the middle point of which is connected to a supply line E. The other end of the section A is also connected to the supply line E. The auxiliary winding is indicated by B and is wound in magnetically angular relation to the winding A, C, preferably a right angular relation. A condenser D is connected in series with the winding B and this circuit, including B and D, is connected across the outside terminals of the winding A, C. The rotor is represented at R and may be of any suitable type, and may have its resistance adjusted so as to obtain any desired torque performance.

When operating at low speed the switch F is closed on the contact L so that the entire winding A, C is in circuit. The motor operates on this connection as a split-phase condenser motor in the usual manner. In order to increase the speed the switch F is moved to the contact H. This cuts the section C of the main winding out of the supply circuit and leaves only the section A. The effective number of turns of the main winding is thus reduced and the magnetic effect thereof is correspondingly increased. Accordingly, the motor will run at increased speed. Under these conditions, however, the voltage effective upon the condenser circuit including the winding B has been increased. The winding C is subject to the action of the magnetic field produced by the winding A, and has induced therein a voltage by the ordinary auto-transformer action. The voltage induced in the section C is added to the line voltage and this increased voltage is impressed on the condenser circuit. It will be seen, therefore, that the excitation of the latter circuit is augmented and that its magnetic effect will be increased by an amount approaching the increase in the field of the winding A. Accordingly, the motor will operate with both its main and its auxiliary fields increased in strength so that the balanced relation between these fields is maintained and a more nearly true rotating field is obtained at the higher speed as well as at the lower speed.

In Figure 2 the arrangement is similar to that of Figure 1, except that the winding C is subdivided into sections C—1 and C—2. The switch F is provided with three contact points: namely, L and H representing low and high speed, as in Figure 1, and an intermediate point I. This arrangement gives three speeds instead of two as in Figure 1. As the switch is moved from the point L successively to the points I and H, the effective number of turns of the main winding is progressively reduced in order to obtain higher speeds. At the same time the voltage on the condenser circuit is progressively increased as the different sections C—1 and C—2 are switched from the winding to the auto-transformer relation. Thus the auto-transformer voltage is progressively increased for the successive speed steps. In this arrangement the windings may be so adjusted with relation to each other that a substantially true rotating field is obtained on the intermediate speed step, while on the low speed step one winding will predominate and on the high speed step the other winding will be stronger so that on all three steps a condition more nearly approaching a true rotating field is obtained.

The advantages of this relation are illustrated in Figure 4. In this figure the curve I represents approximately the speed-torque relation of a split-phase condenser motor operated under normal conditions, as for instance the high speed condition on the contact H of Figure 2. If the speed changes were obtained by simply changing the number of turns of the main winding, while the condenser circuit is maintained permanently connected across the supply line, successive speed reductions by moving the switch F to the contacts I and L would result in successive reduction in the excitation of the auxiliary winding. The effect on the speed-torque curve would be represented by the curves 2 and 3 for the steps I and L respectively. In accordance with the present invention, however, with the condenser circuit connected to the extreme ends of the sections C—1 and C—2 the strength of the auxiliary winding is augmented to keep pace with that of the main winding, and the effect on the speed-torque curves is illustrated by the curves 4 and 5 for the steps I and L respectively. It will be noted that the latter two curves depict a performance approaching nearly that of a polyphase motor. In this case the lower speeds are more stable because the peak of the curve, or the maximum torque value is maintained more nearly constant. Accordingly, a motor so operated will be stable in operation at all speeds.

Figure 5 is intended to represent the relative field strengths produced by the main and auxiliary windings under prior conditions in which the condenser circuit was permanently connected across the supply mains. In this diagram the vertical vector 11 represents the auxiliary field produced by the winding B. The horizontal vectors 12, 13 and 14 represent the strength of the main field under three different conditions, as for instance, when the motor is operating on different taps of the main winding, such as the taps G, I and H. The horizontal vector 12 represents the value of the main field when running on the full main winding. Under ordinary conditions this winding is so adjusted that the strength of this field substantially balances that of the auxiliary winding B. The vector 12, therefore, is substantially equal in length to the vector 11 and under these conditions a substantially true rotating field is obtained, such a field is represented diagrammatically by the circle 30. When the motor is operated on an intermediate tap of the winding, such as the tap I, the main field will be represented by the horizontal vector 13. During such operation, however, the auxiliary field will not be altered so that the vector 11 retains its original length. When these two fields 11 and 13 are now combined an elliptical field is produced as represented in the diagram by the ellipse 20. If the main winding is again strengthened by shifting to a third tap, such as H, this strengthened field is represented by the vector 14 which, combined with the vector 11, produces an elliptical field represented in the diagram by the ellipse 10. Thus the ellipses 10, 20, and 30 represent the field conditions corresponding to the curves 1, 2 and 3 in Figure 4.

When the connections are made in accordance with this invention the shift from tap to tap of the main winding operates to strengthen the auxiliary field as well as the main field. This condition is illustrated in Figure 6. In this figure the vertical vector 15 represents the auxiliary field and the horizontal vector 16 represents the main field when operating on the tap G. When the shift is made to the tap I the auxiliary field is represented by the vector 17 and the main field by the vector 18. Correspondingly operation on the tap 8 is represented by the vectors 19 and 21. As it is usually difficult to maintain an exact balance between the main and auxiliary fields under all of these conditions the winding is usually so adjusted that the balance is obtained in the intermediate condition: namely, when operating on the tap I. Accordingly, the field resulting from the combination of the vectors 17 and 18 is substantially a true rotating field represented in the diagram by the circle 40. When operating on the tap G the auxiliary field represented by the vector 15 may preponderate slightly over the main field represented by the vector 16. Combination of these fields produces a slightly elliptical field represented in the diagram by the ellipse 50 which has its major axis in the vertical direction. When operating on the tap H the main field represented by the vector 21 may preponderate slightly over the auxiliary field represented by the vector 19. Again, a combination of these two results in an elliptical field represented by the ellipse 60 which has its major axis in a horizontal direction. The performance of the motor under conditions represented by the curves 60, 40 and 50 may be illustrated in their relation to each other approximately by the curves 1, 4 and 5 of Figure 4.

A comparison of Figures 5 and 6 will show that in accordance with this invention the motor operates at all speeds with greatly improved stability since a more nearly true rotating field is produced on each tap of the main winding. With the conditions illustrated in Figure 4, it will be clear that when the motor is expected to operate a load, such for instance as a fan whose torque characteristics may be represented by the curve 70 in Figure 4, the present invention provides for operation at each speed on a much more stable portion of the speed torque curve of the motor than is the case with prior motors, such as may be represented in their operation by the curves 1, 2 and 3 of Figure 4.

Figure 3 represents an arrangement of the main winding wherein the separate sections A and C are wound on alternate poles so that by cutting out the section C the alternate pole winding are cut out. This simply effects a simplification in the motor windings and connections, while maintaining a proper balance between the field poles on the different speed connections.

It will be seen, therefore, that this invention provides a motor of improved performance at variable speeds, while maintaining great simplicity in the windings and connections thereof. By augmenting the voltage on the condenser circuit to keep pace with the increase of the stator winding, a more favorable condition of air gap magnetic fields is maintained and a greater stability of operation is thereby accomplished.

It is obvious that various changes may be made within the scope of the appended claims, in the details of construction without departing from the spirit of this invention; it is to be understood, therefore, that this invention is not limited to the specific details shown and/or described.

Having thus described the invention, what is claimed is:

1. A variable-speed, single-phase induction motor, comprising, a rotor having a resistance adapted for variable speed operation, a stator having a main winding and an auxiliary winding wound in magnetically angular relation to said main winding, said main winding having a low-speed running tap at one end thereof and a high-speed running tap intermediate the ends thereof, a condenser circuit including said auxiliary winding permanently connected across the extremities of said main winding, and switching means having a low-speed running position in which the supply line is connected to said low-speed tap and a high-speed running position in which the supply line is connected to said high-speed tap whereby to increase the magnetic effect of said main winding so as to increase the running speed above that of said low-speed position, and whereby simultaneously to increase by transformer action in said main winding the voltage supplied to said condenser circuit in order to increase its magnetic effect in accordance with that of said main winding.

2. The method of regulating the speed of a variable-speed, single-phase induction motor having a main stator winding and an auxiliary stator winding wound in magnetically angular relation to said main winding, comprising, operating the motor under load at a low steady speed by applying a supply voltage to the full main winding while said same voltage is supplied through a condenser to the auxiliary winding, reducing the number of turns of the main winding to which said supply voltage is applied in order to increase the steady running speed, simultaneously stepping up said supply voltage by transformer action in the main winding, and applying such stepped-up voltage through the condenser to the auxiliary winding in order to maintain a nearly uniform rotating field by maintaining substantial equality of excitation in the main and auxiliary fields at all running speeds.

EDWIN C. BALLMAN.